UNITED STATES PATENT OFFICE.

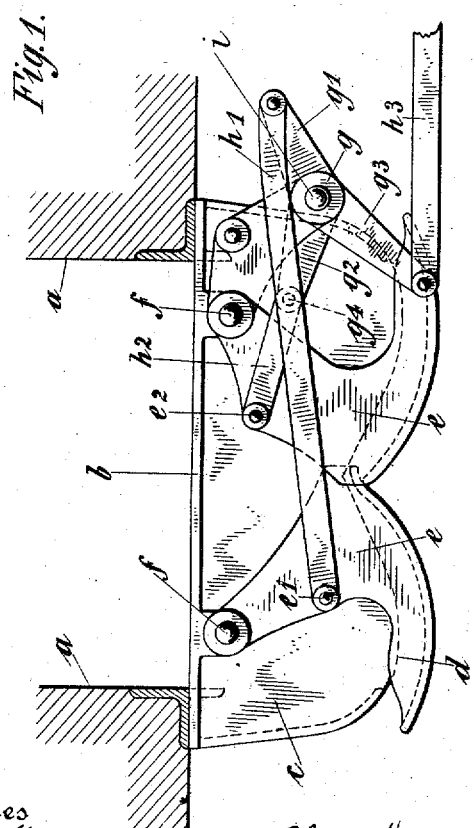

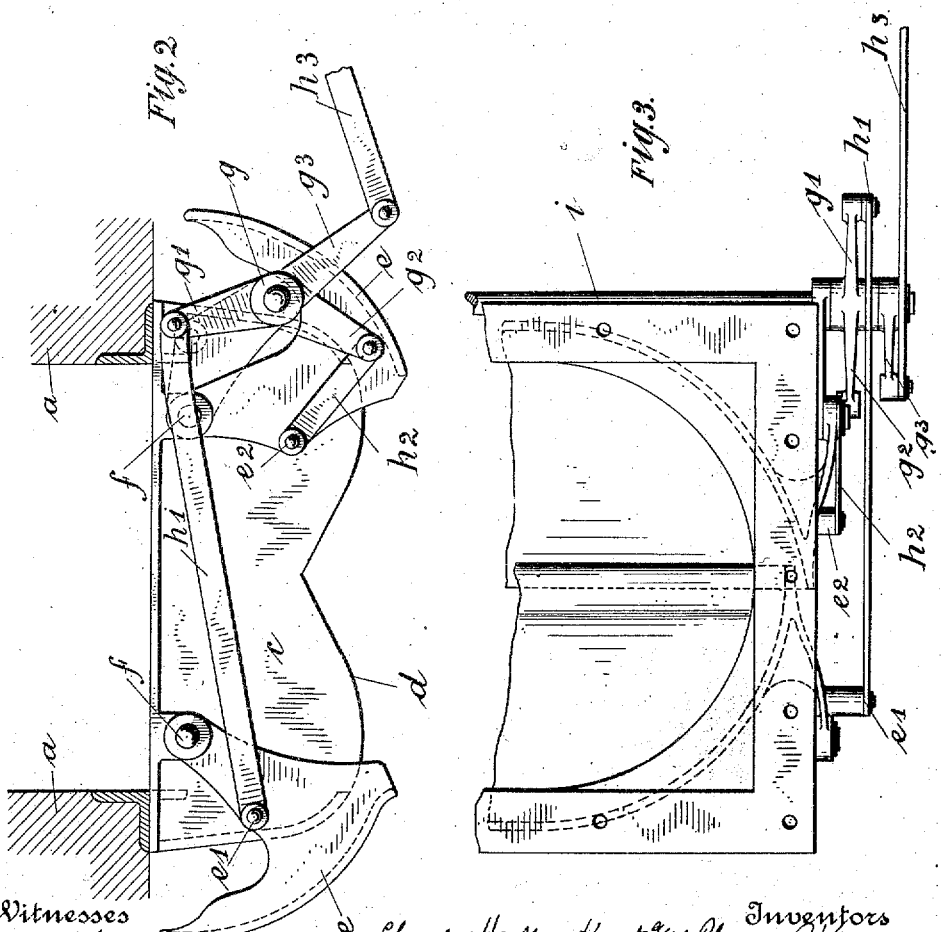

CHARLES W. HUNT AND CHARLES C. KING, OF NEW YORK, N. Y., ASSIGNORS TO C. W. HUNT COMPANY, OF WEST NEW BRIGHTON, NEW YORK, A CORPORATION OF NEW YORK.

HOPPER-VALVE, &c.

954,293. Specification of Letters Patent. Patented Apr. 5, 1910.

Application filed March 17, 1908. Serial No. 421,651.

*To all whom it may concern:*

Be it known that we, CHARLES WALLACE HUNT and CHARLES C. KING, citizens of the United States, residing at West New Brighton, in the borough of Richmond, of the city of New York, in the State of New York, have invented certain new and useful Improvements in Hopper-Valves, &c., of which the following is a specification, reference being had to the accompanying drawings, forming a part hereof.

This invention relates to devices for controlling the flow of coal, ore, grain, etc., from bins or other containers to cars, trucks, etc.

The object of the invention is particularly to improve the means for operating the valves or cut off devices so as to secure greater facility in operation, to insure the retention of the valves or cut off devices in their closed or open positions, as the case may be, and to reduce the necessary depth below the mouth of the chute or bin.

The invention will be more fully explained hereinafter with reference to the accompanying drawings in which it is illustrated and in which—

Figure 1 is a view of the improved construction in side elevation, with the valves or cut off devices in closed position, a portion of the bin or chute being shown in section. Fig. 2 is a view similar to Fig. 1 but with the valves or cut off devices in their open position. Fig. 3 is a partial plan view, showing the operating devices at one end only of the structure.

In the drawings, the spout or chute or bin, which may be of any desired construction, is represented as having walls $a$, $a$, which conduct the material handled toward the mouth or outlet $b$.

The body $c$ of the valve may be of any suitable form or construction, so far as the present invention is concerned, and may be suited to the special requirements of the use for which it is designated, such body comprising a shell secured in position below the mouth $b$ of the chute or bin, and having in its bottom an opening $d$ through which the coal or other material may be discharged. The jaws $e$ which control the delivery of material from the body $c$ are arranged to swing upon centers $f$ at one side of the plane of each jaw, as substantially at the axis of curvature of the jaw, so that they shall cut through the material, being preferably supported upon the frame which forms the upper portion of the body $c$. A plurality of operating arms or levers preferably mounted together upon a common shaft or axis $g$, and suitably supported with relation to the body $c$, have one arm $g'$, connected by a link $h'$ to the remote jaw $e$, as at $e'$, while another arm or member $g^2$ is connected by a link $h^2$ to the adjacent jaw $e$, as at $e^2$. A third arm $g^3$ may be provided and connected by a link $h^3$ to the actuating lever which may be mounted at any convenient point. If the dimensions of the valve are such as to make it desirable that operating devices shall be applied to the jaws at both ends thereof, the several arms or members $g'$ and $g^2$ may be secured to a shaft $i$ which is suitably supported with respect to the body $c$ and extends from end to end thereof, having at each end arms or members $g'$ and $g^2$. The actuating arm $g^3$ is not necessarily duplicated for each set of operating devices, but may be common to both and may be secured to the shaft $i$ at any convenient point in its length, being combined with one of the arms $g'$ or $g^2$ if convenience makes it desirable.

It will be observed that when the jaws of the valve are in their closed position, one of the arms, such as the arm $g^2$, and its corresponding link, as the link $h^2$, are in or moved slightly beyond or out of a straight line, or the centers $e^2$, $g^4$ and $i$ are in or moved slightly beyond or out of a straight line, so that no pressure of the material against the corresponding jaw $e$ can move it from its closed position. At the same time the centers of the arm $g'$ and link $h'$ are brought so nearly into a straight line that no ordinary pressure of material against the corresponding jaw $e$ is likely to start it from its closed position, while the mechanism is operated easily and with great power through the arm $g^3$.

It will be evident that the prescribed arrangement of the operating devices for the jaws not only permits the jaws to be operated with great ease and insures their retention in the closed position, regardless of any pressure upon the jaws from within, but also permits the height of the body $c$ to be much less than is necessary with such operating devices for the jaws as have been employed hitherto. It will also be evident that the details of construction and proportion of parts of the improved devices may be varied to suit different conditions and that the invention, therefore, is not to be restricted to the precise construction shown and described herein.

The relative construction of the edges of the two jaws, the edge of one being offset vertically with respect to the edge of the other, and the extension of the valve body outwardly beyond the margin of the mouth, are not claimed herein, these features being the invention of one of these applicants and being made the subject of separate applications.

We claim as our invention:

In a structure of the character described, the combination of a body, jaws swinging each about an axis at one side of the plane of the jaw, a plurality of operating arms or levers, a link connection from each of said arms to the corresponding jaw, one of said arms and the corresponding link standing in or beyond a straight line when the jaws are closed, and operating devices for said lever.

This specification signed and witnessed this 10th day of March A. D., 1908.

CHARLES W. HUNT.
C. C. KING.

Signed in the presence of—
CHAS. E. SIMONSON,
B. KELLY.